Patented July 23, 1929.

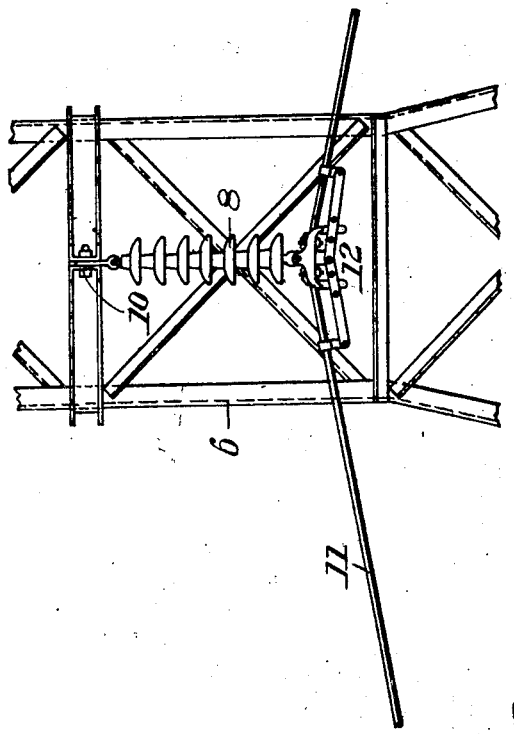
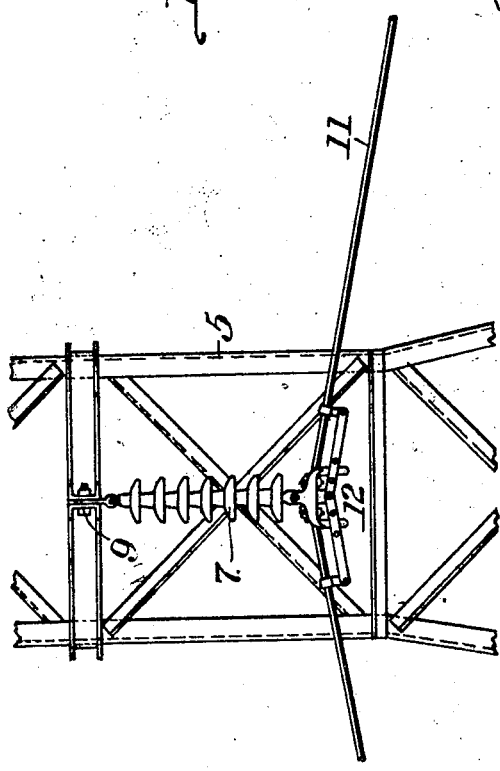
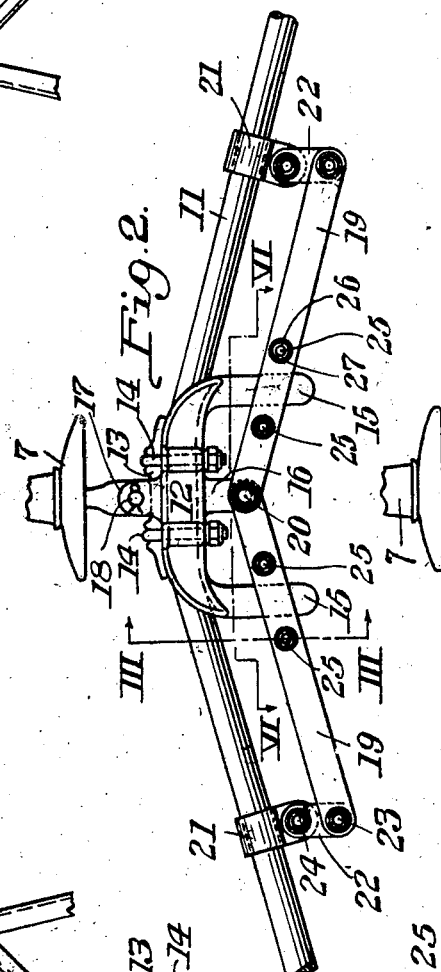
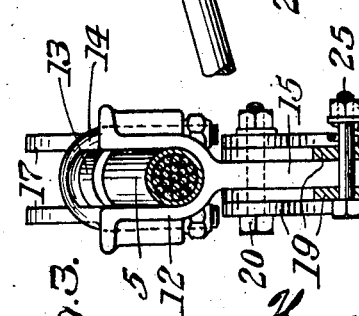
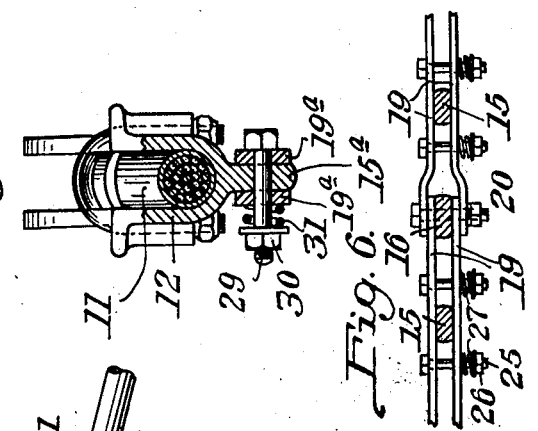
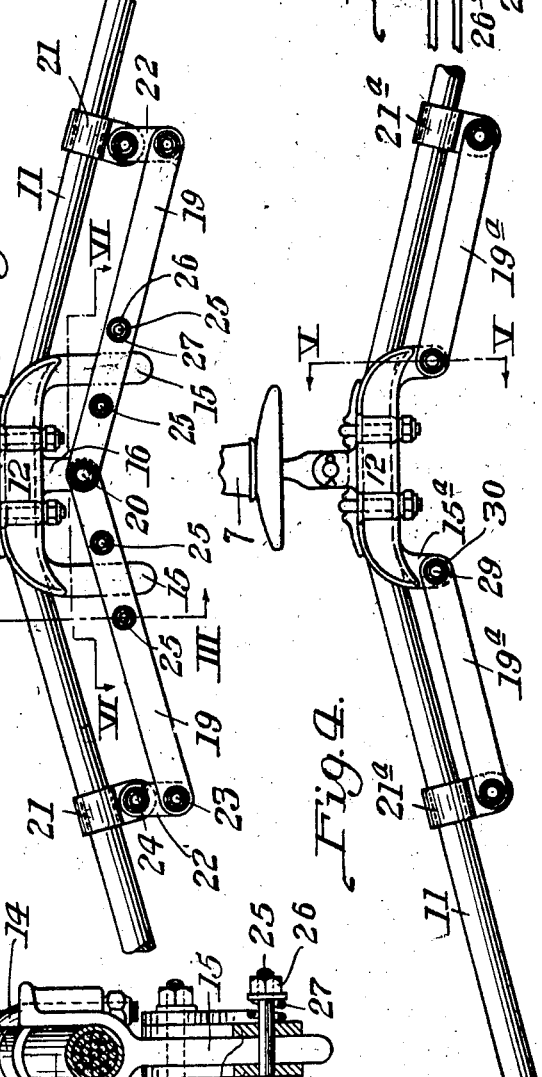

1,722,118

UNITED STATES PATENT OFFICE.

THEODORE VARNEY, OF SEWICKLEY, PENNSYLVANIA, ASSIGNOR TO ALUMINUM COMPANY OF AMERICA, OF PITTSBURGH, PENNSYLVANIA, A CORPORATION OF PENNSYLVANIA.

SUSPENSION MEANS FOR TRANSMISSION-LINE CONDUCTORS.

Application filed February 25, 1927. Serial No. 170,927.

This invention relates to improvements in suspension means for transmission line cables, and particularly to means of the character stated embodying means for damping vibrations in an overhead transmission line cable or conductor.

Tests made by me show that the vibrations set up in an overhead transmission line conductor exist practically altogether in a vertical plane, and the present invention is particularly directed to means for taking care of or correcting these vertical vibrations at critical points in the line.

These vertical vibrations are continuous in character when the tension of the wire, the wind velocity, and the particular weight of the cable are all of a certain value. That is to say, under the conditions mentioned, the conductor wire or cable is "tuned" and will persist in continuous resonant vibrations, having nodes and loops throughout the conductor span.

These loops in the main body of the span do no harm because they are balanced against one another, and do not produce any undue stresses in the conductor. However, at the point of support of the span, the vibrating loop sometimes produces destructive effects, and it is necessary to cushion the cable at these points so that the vibrations will be absorbed without shock.

Attempts have been made to overcome the serious troubles due to these vibrations by attaching a heavy weight to the cable span. It has been found, however, that this method is wrong, for the reason that the wave strikes the weight and is reflected. This reflection produces a blow against the weight, resulting in a heavy stress in the conductor at that point.

The prime object of the present invention is to provide, in a cable suspension device, simple and efficient means for damping vibrations of the character specified, and particularly at points of support of the conductor line, by bringing the conductor line to rest at the said points.

Another object of my invention is to provide a combined cable support and vibration damping structure embodying mechanical friction means.

In the accompanying drawings, which illustrate applications of my invention:

Fig. 1 is a diagrammatic view, showing portions of two transmission line towers, a span of conductor wire or cable therebetween, with my invention applied to the line at the points of support;

Fig. 2, an elevational view showing my invention supporting a conductor wire or cable from a string insulator support;

Fig. 3, a sectional view taken on line III—III of Fig. 2;

Fig. 4, a view similar to Fig. 2, showing a modified form of my invention;

Fig. 5, a sectional view taken on line V—V of Fig. 4;

Fig. 6, a part plan view and a part sectional view taken on line VI—VI of Fig. 2.

Referring to the drawings, 5 and 6 designate portions of two transmission line towers of the usual construction, and 7 and 8 designate string insulator supports, respectively, depending from cross members 9 and 10 of the said towers. 11 indicates a conductor line wire or cable.

As illustrated in the form of Fig. 2, my invention comprises a suspension clamp and damping device including a lower or main member designated generally by the numeral 12, and a cap member 13, the latter being attached to member 12 by a pair of U-bolts 14.

Member 12 is elongated and is provided with a relatively large curved contacting surface to receive the wire or cable, so that the conductor may be clamped without causing an abrupt bend in the conductor. Member 12 is further provided with a pair of centrally disposed depending end members 15, a depending intermediate member 16, and with upstanding apertured members 17, the latter being designed to be pivotally connected with the lower end of a string insulator support by a bolt 18.

A characteristic and important feature of the present invention is the means for resisting or damping the vibrations of the conductor cable at its point of support, and these means, as shown in the form of Fig. 2, include a pair of divided lever arms 19 pivotally connected at their inner ends to the depending member 16 by a bolt 20, and each having its outer end connected to a clamp 21 by a link 22. Clamps 21 are spaced away from opposite ends of the main clamp and surround the conductor cable 11 at desired points thereto. 23 and 24 designate pins or bolts provided for connecting the links 22 to the lower arms 19 and to the clamps 21. Arms 19 are preferably formed of relatively thin spring metal pieces capable of being flexed sufficiently to frictionally engage the depending members 15, which latter have portions thereof passed between the said pieces constituting the divided lower arms.

To produce the desired friction between the said arms and the depending members 15, I provide a plurality of headed bolts 25 having threaded nuts 26 adjustably mounted thereon and springs 27, the latter surrounding the bolts and maintained in operative position thereon between the respective nuts and a face of one of the pieces constituting an arm. Other suitable means, however, may be provided for flexing the arms 19 to produce the desired frictional resistance.

In the form of Fig. 4, I have shown a modified construction. In this latter form, arms 19ª are pivotally connected to short depending members 15ª, and have their motion resisted at their points of pivotal connection with the clamp. The arms are connected to the clamp by pivot bolts 29 passed through the arms and the members 15ª. Each pivot bolt 29 is provided with an adjustable nut 30 and a spring 31, all as particularly shown by Fig. 5.

In this form of Fig. 4, it will be seen that the desired friction is provided at the pivot points located at the ends of the clamp structure. Clamps 21ª are employed for connecting the outer ends of arms 19ª to the conductor cable 11 at points spaced away from the clamp, as in the form of Fig. 2. In this modified form, however, the outer ends of the arms are connected directly to the clamps 21ª.

What I claim is:

1. Suspension means for transmission line cables including a main suspension clamp having a depending member for supporting a line cable, means associated with the main clamp for damping vibrations set up in the line cable including an arm pivotally secured to the depending member of the clamp at one end and projecting therefrom in line with and below the cable and having its outer end connected with the cable at a point spaced from the suspension clamp, and positively operable co-acting friction means on the arm and the clamp.

2. Suspension means for transmission line cables including a main suspension clamp for supporting a line cable, a pair of arms pivotally secured to the clamp at one end and projecting therefrom in opposite directions and in line with and below the cable and having their outer ends connected with the cable at points spaced from the suspension clamp, and positively operable adjustable co-acting friction means between the arms and the clamp.

3. Suspension means for transmission line cables including a suspension clamp having a depending member, means associated with the clamp for damping out vibrations set up in the line cable including a divided arm pivotally secured to the depending member at one end and projecting therefrom in line with the cable, means including a clamp and link construction for connecting its outer end with the cable at a point spaced from the suspension clamp, and means for varying the frictional resistance between the depending member and the arm.

4. Suspension means for transmission line cables including a suspension clamp having depending members arranged at the ends thereof and an intermediate depending arm supporting member, arms pivotally secured to the intermediate depending member and projecting therefrom in line with the cable and having their outer ends connected with the cable at points spaced from the suspension clamp, said arms arranged in frictional contact with the end depending members of the clamp, and means for varying the frictional resistance between said arms and said depending members.

5. Suspension means for transmission line cables including a suspension clamp having a depending member, means associated with the clamp for damping out vibrations set up in the line cable including an arm pivotally secured to the depending member at one end and projecting therefrom in line with and below the cable, means for pivotally connecting the outer end of the arm with the cable at a point spaced from the suspended clamp, and adjustable co-acting friction means between the arm and the clamp.

In testimony whereof I affix my signature.

THEODORE VARNEY.